(12) United States Patent
Fink

(10) Patent No.: US 6,942,222 B2
(45) Date of Patent: Sep. 13, 2005

(54) SEAL FOR SEALING AND LOAD BEARING A PROCESS TUBE IN A VACUUM SYSTEM

(75) Inventor: Steven T. Fink, Mesa, AZ (US)

(73) Assignee: Tokyo Electron Limited, Tokyo (JP)

( * ) Notice: Subject to any disclaimer, the term of this patent is extended or adjusted under 35 U.S.C. 154(b) by 0 days.

(21) Appl. No.: 10/450,814

(22) PCT Filed: Dec. 19, 2001

(86) PCT No.: PCT/US01/45860

§ 371 (c)(1),
(2), (4) Date: Nov. 4, 2003

(87) PCT Pub. No.: WO02/50463

PCT Pub. Date: Jun. 27, 2002

(65) Prior Publication Data

US 2004/0080120 A1 Apr. 29, 2004

Related U.S. Application Data

(60) Provisional application No. 60/256,330, filed on Dec. 19, 2000.

(51) Int. Cl.[7] .............................................. F16L 17/06
(52) U.S. Cl. .................... 277/608; 277/602; 277/616
(58) Field of Search ................................. 277/602, 608, 277/616

(56) References Cited

U.S. PATENT DOCUMENTS

| | | | | |
|---|---|---|---|---|
| 2,532,891 A | * | 12/1950 | Chupp | 285/97 |
| 2,900,199 A | * | 8/1959 | Logan | 277/614 |
| 3,693,986 A | | 9/1972 | Lambie | |
| 4,081,083 A | * | 3/1978 | Glauser et al. | 213/76 |
| 4,361,331 A | * | 11/1982 | Kohler | 277/314 |
| 4,410,186 A | | 10/1983 | Pierce, Jr. | |
| 4,641,603 A | | 2/1987 | Miyazaki et al. | |
| 5,898,127 A | | 4/1999 | Schuhmacher et al. | |
| 6,419,237 B1 | * | 7/2002 | More | 277/602 |

* cited by examiner

Primary Examiner—Enoch E. Peavey
(74) Attorney, Agent, or Firm—Oblon, Spivak, McClelland, Maier & Neustadt, P.C.

(57) ABSTRACT

A seal for sealing and load bearing a process tube in a vacuum system including a seal member and a load bearing spacer provided in a seal cavity. The seal generally includes a seal cavity provided in a housing, where the seal cavity is configured opposite the process tube. At least one load bearing spacer is received within the seal cavity and adapted to contact the process tube is mounted to the housing. Additionally, at least one seal member is received within the seal cavity and adapted to contact the process tube.

20 Claims, 3 Drawing Sheets

SEAL FOR SEALING AND LOAD BEARING A PROCESS TUBE IN A VACUUM SYSTEM

This application is a National Stage of International Application No. PCT/US 01/45860 filed Dec. 19, 2001, which claims the benefit of U.S. Provisional Application No. 60/256,330 filed Dec. 19, 2000.

BACKGROUND OF THE INVENTION

1. Field of the Invention

The present invention relates generally to a seal for a vacuum system, and more particularly, a seal for sealing and load bearing a process tube in a chamber.

2. Discussion of the Background

FIG. 1 depicts a plasma chamber arrangement that includes a process tube 210 having a mounting rim 212 that is mounted within a metal housing or processing chamber by clamping the mounting rim 212 between a first metal housing section 214 and a second metal housing section 216. The process tube 210 defines a vacuum chamber 200 on one side thereof and a coolant fluid chamber 202 on a second side thereof. The coolant fluid within the coolant fluid chamber 202 is used to control the temperature of the process tube 210. Such a configuration requires a gas seal 220 on one side of the mounting rim 212, and a coolant fluid seal 230 on a second side of the mounting rim 212. Additionally, it may be necessary to provide a load bearing spacer 240 between the first metal housing section 214 and the mounting rim 212, and a load bearing spacer 250 between the second metal housing section 216 and the mounting rim 212 in order to prevent high stress point loading of the mounting rim 212, which could result in cracking and failure of the process tube 210.

The configuration depicted in FIG. 1 requires that two precision cuts be made in each of the metal housing sections, one for each load bearing spacer and one for each seal. Therefore, a total of four precision cuts need to be made in order to construct the configuration depicted in FIG. 1. Such precision cuts are difficult and expensive to make, and occupy a large amount of area on the metal housing. Accordingly, there is a need for an improved seal configuration.

FIG. 3 depicts a plasma chamber arrangement that includes a process tube 310 having a mounting rim 312 that is mounted within a metal housing or processing chamber by affixing the mounting rim 312 to a metal housing section 314. The process tube 310 defines a vacuum chamber 300 on one side thereof and a coolant fluid chamber 302 on a second side thereof. Such a configuration requires a gas seal 320, and a coolant fluid seal 330. Additionally, it may be necessary to provide a load bearing spacer 340 between the metal housing section 314 and the mounting rim 312 in order to prevent high stress point loading of the mounting rim 312, which could result in cracking and failure of the process tube 310.

The configuration depicted in FIG. 3 requires that three precision cuts be made in the metal housing section, one for the load bearing spacer and one for each seal. Such precision cuts are difficult and expensive to make, and occupy a large amount of area on the metal housing. Accordingly, there is a need for an improved seal configuration.

SUMMARY OF THE INVENTION

Accordingly, the present invention advantageously provides a seal for sealing and load bearing a process tube in a vacuum system, wherein the seal includes a seal member and a load bearing spacer provided in a seal cavity.

A first embodiment of the present invention advantageously provides a seal for use in a plasma chamber arrangement that requires a first fluid seal, for example a gas seal, on one side of a mounting rim of a fluid cooled process tube, and a second fluid seal, for example a coolant fluid seal, on a second side of the fluid cooled process tube. The process tube is mounted within a metal housing or plasma processing chamber by clamping the mounting rim of the process tube in between a first housing section and a second housing section of the metal housing. The process tube divides the plasma processing chamber into a vacuum chamber and a fluid coolant chamber.

In order to prevent a loss of the vacuum state within the vacuum chamber, a seal is provided in the second housing section. The seal includes a seal configured opposite a surface of the mounting rim of the process tube. The seal cavity includes an opening and lip portions extending adjacent the opening. The seal further includes first and second load bearing spacers received within the seal cavity. The first and second load bearing spacers are adapted to cushion the mounting rim from the contact with the second housing section. The load bearing spacer includes a contact surface that is configured to abut the surface of the mounting rim, and a contact surface that is configured to abut the bottom of the seal cavity. The load bearing spacer further includes a protruding portion configured to hook beneath the lip portion of the seal cavity, and an inclined surface on a side opposite to the protruding portion. The first and second load bearing spacers are mirror images of one another. The seal further includes a fluid seal member received within the seal cavity. The fluid seal member and the load bearing spacers are sized and configured, and are positioned within the seal cavity such that the fluid seal member is in between the load bearing spacers such that the fluid seal member captivates the protruding portions of the load bearing spacers beneath the lip portions of the seal cavity.

In order to prevent a leakage of coolant fluid from the fluid coolant chamber a seal is provided in the first housing section. The seal in the first housing section is generally identical in structure to the seal described above.

The first embodiment of the present invention advantageously provides a configuration wherein only one precision groove or seal cavity is required for each seal, which each include two load bearing spacers and an associated seal member. This configuration of elements is adaptable to any size o-ring and load bearing spacers required. This configuration advantageously uses much less space on the housing sections, is easier to assemble, and is cheaper to manufacture than other versions described above with regard to FIG. 1. Additionally, the first embodiment provides a configuration wherein the various elements of the seal are captivated within the seal cavity, which provides for easy assembly and handling of the metal housing sections and process tube.

A second embodiment of the present invention advantageously provides a seal for use in a plasma chamber arrangement that requires a first fluid seal, for example a gas seal, and a second fluid seal, for example a coolant fluid seal, on one side of a mounting rim of a fluid cooled process tube.

The seal configuration of the second embodiment includes a process tube mounted within a metal housing or plasma processing chamber by affixing a mounting rim thereof to a housing section of the metal housing using an attachment device. In order to prevent a loss of the vacuum state within the vacuum chamber and in order to prevent a leakage of coolant fluid from the fluid coolant chamber, a seal is provided in the housing section. The seal includes a seal cavity, where the seal cavity is configured opposite a surface of the mounting rim. The seal cavity includes an opening and lip portions extending adjacent the opening. The seal further includes a load bearing spacer, a first seal member, and a second seal member received within the seal cavity. The first seal member acts to prevent a leakage of fluid coolant from the fluid coolant chamber by forming a tight contact seal with the surface of the mounting rim, and the second seal member acts to prevent a loss of the vacuum state within the vacuum chamber by forming a tight contact seal with the surface of the mounting rim. The first and second seal members, and the load bearing spacer are sized and configured, and are positioned within the seal cavity such that the load bearing spacer is in between the first and second seal members such that the load bearing spacer captivates the first and second seal members within the seal cavity beneath the lip portions thereof. The seal can be provided with a leak check port connected to the seal cavity.

The second embodiment of the present invention advantageously provides a configuration wherein only one precision groove or seal cavity is required for the seal, which includes one load bearing spacer and two seal members. This configuration advantageously uses much less space on the housing sections, is easier to assemble, and is cheaper to manufacture than other versions described above with regard to FIG. 3. Additionally, the second embodiment provides a configuration wherein the various elements of the seal are captivated within the seal cavity, which provides for easy assembly and handling of the metal housing section and process tube.

A third embodiment of the present invention advantageously provides a seal for use in a plasma chamber arrangement that requires a first fluid seal, for example a gas seal, and a second fluid seal, for example a coolant fluid seal, on one side of a mounting rim of a fluid cooled process tube. The third embodiment is similar to the second embodiment, yet the third embodiment advantageously includes a load bearing spacer that is adapted to be fastened to the housing section by one or more fasteners thereby captivating the seal member and the load bearing spacer within the seal cavity.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which.

DESCRIPTION OF THE PREFERRED EMBODIMENTS

Figure 2:
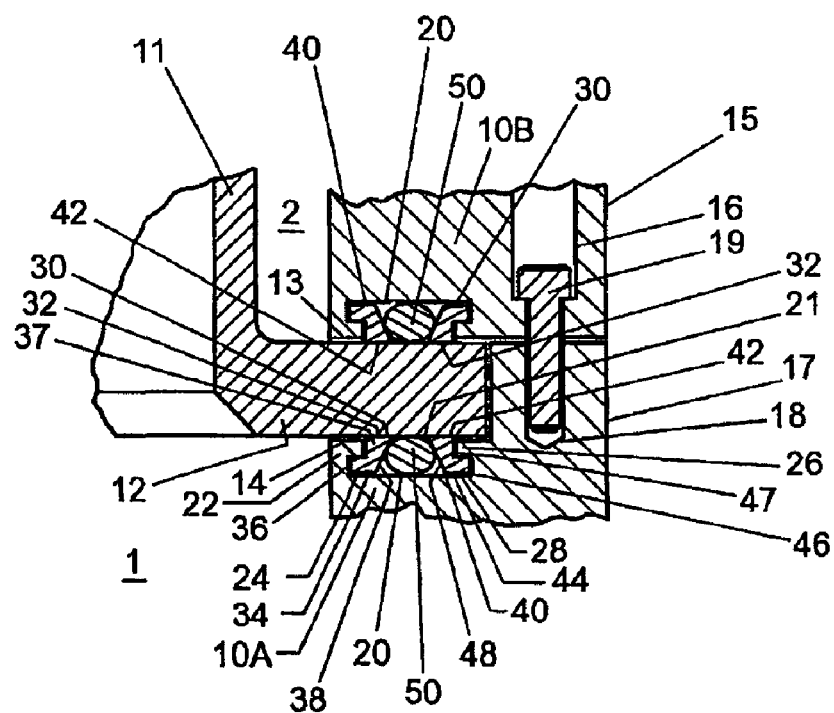
FIG. 2 is a partial cross-sectional view of a first embodiment of a seal according to the present invention for a plasma processing chamber and a process tube.
Figure 4:
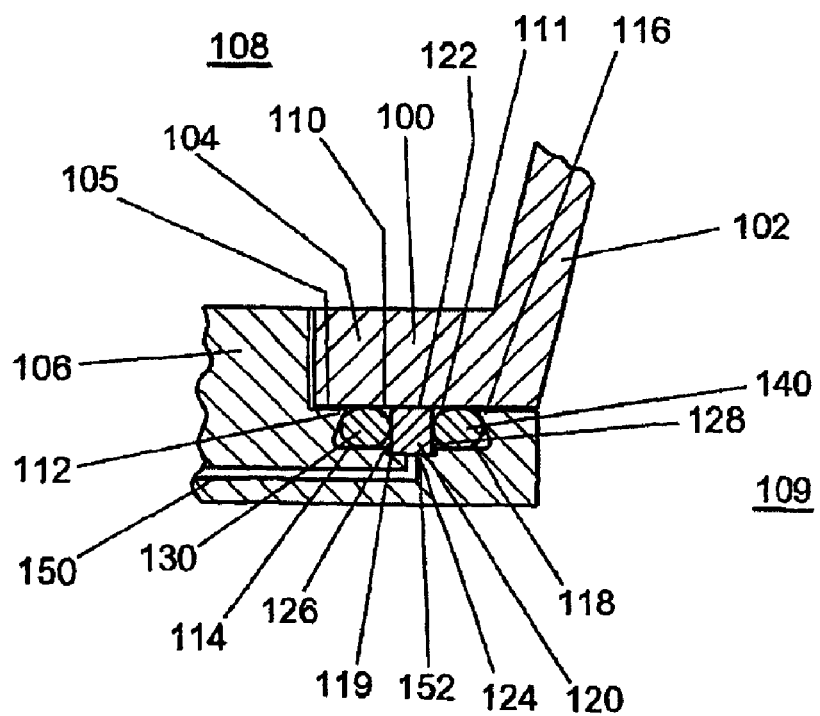
FIG. 4 is a partial cross-sectional view of a second embodiment of a seal according to the present invention for a plasma processing chamber and process tube.
Figure 5:
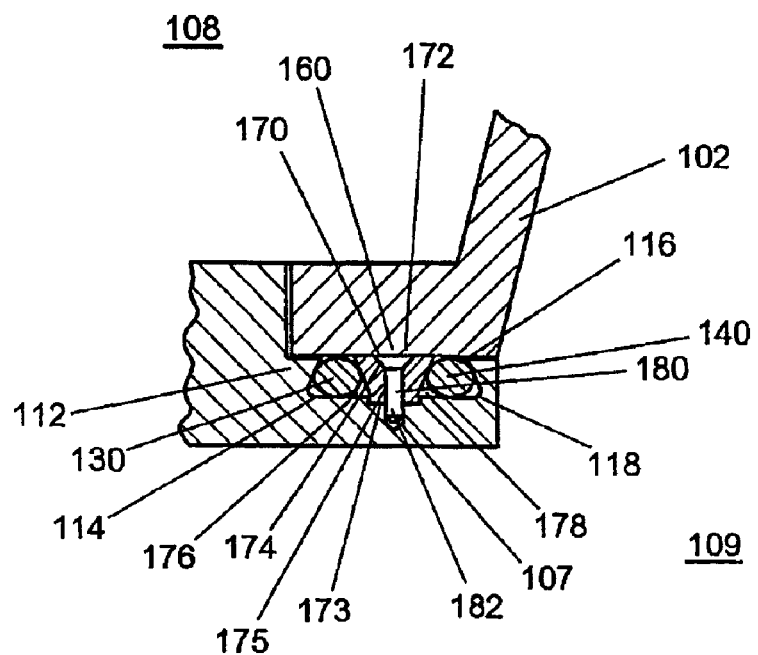
FIG. 5 a partial cross-sectional view of a third embodiment of a seal according to the present invention for a plasma processing chamber and process tube.

Referring now to the drawings, FIGS. 2, 4, and 5 depict various embodiments according to the present invention. The present invention advantageously provides a seal for a process tube including a seal cavity in a housing where the seal cavity is configured opposite the process tube, at least one load bearing spacer received within the seal cavity, and at least one seal member received within the seal cavity. FIG. 2 depicts a first embodiment of the present invention for use in a plasma chamber arrangement that requires a first fluid seal, for example a gas seal, on one side of a mounting rim of a fluid cooled process tube, and a second fluid seal, for example a coolant fluid seal, on a second side of the mounting rim of the fluid cooled process tube. FIG. 4 depicts a second embodiment of the present invention for use in a plasma chamber arrangement that requires a first fluid seal, for example a gas seal, and a second fluid seal, for example a coolant fluid seal, on one side of a mounting rim of a fluid cooled process tube. FIG. 5 depicts a third embodiment that includes a load bearing spacer configuration that is adapted to be fastened to a housing section. Each of these embodiments will be disclosed in detail below, however, it should be noted that the exemplary embodiments depicted and described herein set forth the preferred embodiments of the present invention, and are not meant to limit the scope of the claims hereto in any way.

FIG. 2 depicts a first embodiment of a seal configuration for a fluid cooled process tube 11 according to the present invention. The process tube 11 is generally cylindrical in shape and includes a mounting rim 12. The process tube 11 is mounted within a metal housing or plasma processing chamber by clamping the mounting rim 12 of the process tube 11 in between a first housing section 15 and a second housing section 17 of the metal housing. The figures provided herein are partial, cross-sectional views of the plasma processing chamber and process tube, which are both generally cylindrical in shape. The process tube 11 divides the plasma processing chamber into a vacuum chamber 1 and a fluid coolant chamber 2. The first housing section 15 is connected to the second housing section 17 by a bolt 19 that is seated within a recess 16 in the first housing section 15, and extends within and is threadably mated with a threaded hole 18 in the second housing section 17. The bolt 19 can be used to clamp the mounting rim 12 of the process tube 11 by forcing the second housing section 17 into contact with the first housing section 15.

In order to prevent a loss of the vacuum state within the vacuum chamber 1, a seal 10A is provided in the second housing section 17. The seal 10A includes a seal cavity 20 provided in the second housing section 17, where the seal cavity 20 is configured opposite a surface 14 of the mounting rim 12 of the process tube 11. The seal cavity 20 extends about the entire perimeter of the cylindrical second housing section 17. The seal cavity 20 includes an opening 21 and lip portions 22 and 26 extending adjacent the opening 21. The seal cavity thereby includes recessed portions 24 and 28 beneath lip portions 22 and 26, respectively.

The seal 10A further includes a first load bearing spacer 30 and a second load bearing spacer 40 received within the seal cavity 20. The first and second load bearing spacers, 30 and 40, are adapted to cushion the mounting rim 12 of the process tube 11 from the contact with the second housing section 17. When a large diameter process tube, which is preferably made of ceramic or quartz, is required for a plasma processing chamber, the axial vacuum and fluid load at the mating surfaces between the process tube and the metal housing increases to levels where one or more load bearing spacers are required to be installed. The load bearing spacers 30 and 40 are preferably made from glass filled teflon and are configured to cushion the process tube 11. Without the presence of the load bearing spacers, the process tube 11 would be in danger of point loading, which could result in the formation of cracks that would lead to failure of the process tube 11 under load.

The load bearing spacer 30 includes a contact surface 32 that is configured to abut the surface 14 of the mounting rim 12. The load bearing spacer 30 includes a contact surface 34 that is configured to abut the bottom of the seal cavity 20. The load bearing spacer 30 includes a protruding portion 36 configured to hook beneath the lip portion 22 of the seal cavity 20 and fit within the recessed portion 24. The load bearing spacer 30 includes a recessed portion 37 configured to receive the lip portion 22 of the seal cavity 20. The load bearing spacer 30 further includes an inclined surface 38 on a side of the load bearing spacer 30 opposite to the protruding portion 36. The load bearing spacer 30 is formed in an elongated strip of material of a constant cross-sectional shape.

The load bearing spacer 40 is a mirror image of the load bearing spacer 30. It should be noted that the load bearing seal 30 and the load bearing seal 40 are the same part with one load bearing spacer being pivoted one hundred and eighty degrees about a vertical axis. The load bearing spacer 40 includes a contact surface 42 that is configured to abut the surface 14 of the mounting rim 12. The load bearing spacer 40 includes a contact surface 44 that is configured to abut the bottom of the seal cavity 20. The load bearing spacer 40 includes a protruding portion 46 configured to hook beneath the lip portion 26 of the seal cavity 20 and fit within the recessed portion 28. The load bearing spacer 40 includes a recessed portion 47 configured to receive the lip portion 26 of the seal cavity 20. The load bearing spacer 40 further includes an inclined surface 48 on a side of the load bearing spacer 40 opposite to the protruding portion 46. The load bearing spacer 40 is formed in an elongated strip of material of a constant cross-sectional shape.

The seal 10a further includes a fluid seal member 50 received within the seal cavity 20. The fluid seal member 50 acts to prevent a loss of the vacuum state within the vacuum chamber 1 by forming a tight contact seal with the surface 14 of the mounting rim 12 of the process tube 11. The fluid seal member 50 is preferably an o-ring that preferably has a generally circular cross-sectional shape, although the fluid seal member can alternatively be formed having a variety of cross-sectional shapes. The fluid seal member 50 and the load bearing spacers 30 and 40 are sized and configured, and are positioned within the seal cavity 20 such that the fluid seal member 50 is in between the load bearing spacers 30 and 40 such that the fluid seal member 50 captivates the load bearing spacers 30 and 40 within the seal cavity 20.

The seal 10a is assembled by first inserting the load bearing spacers 30 and 40 within the seal cavity 20 such that the respective protruding portions 36 and 46 are positioned beneath the lip portions 22 and 26. Then, the fluid seal member 50 is pressed in between the load bearing spacers 30 and 40, as depicted in FIG. 2. In this configuration, the fluid seal member 50 pushes against the inclined surfaces 38 and 48 of the load bearing spacers 30 and 40, such that the load bearing spacers 30 and 40 are forced or biased away from one another. This force acting on the load bearing spacers 30 and 40 ensures that the protruding portions 36 and 46 of the load bearing spacers 30 and 40 are captivated within the recessed portions 24 and 28 of the seal cavity 20. The inclined surfaces 38 and 48 of the load bearing spacers 30 and 40 ensure that the fluid seal member 50 is captivated within the seal cavity 20. Note that the fluid seal member 50 and the load bearing spacers 30 and 40 can be removed from the seal cavity 20 by prying or forcing the fluid seal member out from between the load bearing spacers 30 and 40, and then removing the load bearing spacers 30 and 40.

In order to prevent a leakage of coolant fluid from the fluid coolant chamber 2, a seal 10b is provided in the first housing section 15. The seal 10b is generally identical in structure to the seal 10a described above, and therefore identical features have been provided with identical reference numerals and a repetitious description of identical features has been omitted as such features are described in detail above. The seal 10b includes a seal cavity 20 provided in the first housing section 15, where the seal cavity 20 is configured opposite a surface 13 of the mounting rim 12 of the process tube 11. The load bearing spacer 30 of the seal 10b includes a contact surface 32 that is configured to abut the surface 13 of the mounting rim 12. The load bearing spacer 40 of the seal 10b includes a contact surface 42 that is configured to abut the surface 13 of the mounting rim 12. The fluid seal member of the seal 10b may differ from the fluid seal member of the seal 10a in that the fluid seal member of seal 10b may be made of a material suitable to provide a vacuum seal, while the fluid seal member of the seal 10a may be made of a different material suitable to provide a coolant fluid seal.

Figure 1:
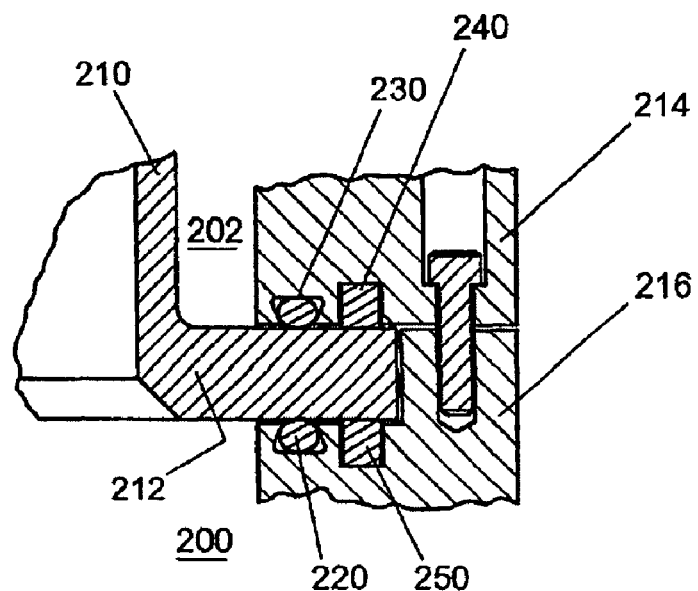
FIG. 1 is a partial cross-sectional view of a first seal configuration for a plasma processing chamber and a process tube.

The first embodiment of the present invention advantageously provides a configuration wherein only one precision groove or seal cavity is required for each seal 10a and 10b, which each include two load bearing spacers and an associated seal member. This configuration of elements is adaptable to any size o-ring and load bearing spacers required. This configuration uses much less space on the housing sections, is easier to assemble, and is cheaper to manufacture than other versions described above with regard to FIG. 1.

FIG. 4 depicts a second embodiment of a seal configuration for a fluid cooled process tube 102 according to the present invention. The process tube 102 is generally cylindrical in shape and includes a mounting rim 104. The process tube 102 is mounted within a metal housing or plasma processing chamber by affixing the mounting rim 104 of the process tube 102 to a housing section 106 of the metal housing using an attachment device (not depicted). The figures provided herein are partial, cross-sectional views of the plasma processing chamber and process tube, which are both generally cylindrical in shape. The process tube 102 divides the plasma processing chamber into a fluid coolant chamber 108 and a vacuum chamber 109.

In order to prevent a loss of the vacuum state within the vacuum chamber 109 and in order to prevent a leakage of coolant fluid from the fluid coolant chamber 108, a seal 100 is provided in the housing section 106. The seal 100 includes a seal cavity 110 provided in the housing section 106, where the seal cavity 110 is configured opposite a surface 105 of the mounting rim 104 of the process tube 102. The seal cavity 110 extends about the entire perimeter of the cylindrical housing section 106. The seal cavity 110 includes an opening 111 and lip portions 112 and 116 extending adjacent the opening 111. The seal cavity thereby includes recessed portions 114 and 118 beneath lip portions 112 and 116, respectively.

The seal 100 further includes a load bearing spacer 120 received within the seal cavity 110. The load bearing spacer 120 is adapted to cushion the mounting rim 104 of the process tube 102 from the contact with the housing section 106. When a large diameter process tube, which is preferably made or ceramic or quartz, is required for a plasma processing chamber, the axial vacuum and fluid load at the mating surfaces between the process tube and the metal housing increases to levels where one or more load bearing spacers are required to be installed. The load bearing spacer 120 is preferably made from glass filled teflon and is configured to cushion the process tube 102. Without the presence of the load bearing spacer, the process tube 102 would be in danger of point loading, which could result in the formation of cracks that would lead to failure of the process tube 102 under load.

The load bearing spacer 120 includes a contact surface 122 that is configured to abut the surface 105 of the mounting rim 104. The load bearing spacer 120 includes a contact surface 124 that is configured to abut the bottom of the seal cavity 110. The load bearing spacer 120 includes opposing side surfaces 126 and 128. The load bearing spacer 120 is formed in an elongated strip of material of a constant cross-sectional shape.

The seal 100 further includes a first seal member 130 and a second seal member 140 received within the seal cavity 110. The first seal member 130 acts to prevent a leakage of fluid coolant from the fluid coolant chamber 108 by forming a tight contact seal with the surface 105 of the mounting rim 104 of the process tube 102. The second seal member 140 acts to prevent a loss of the vacuum state within the vacuum chamber 109 by forming a tight contact seal with the surface 105 of the mounting rim 104 of the process tube 102. The first and second seal members 130 and 140 are preferably o-rings that preferably have a generally circular cross-sectional shape, although the fluid seal members can alternatively be formed having a variety of cross-sectional shapes. The first seal member 130 may differ from the second seal member 140 in that the second seal member 140 may be made of a material suitable to provide a vacuum seal, while the first seal member 130 may be made of a different material suitable to provide a coolant fluid seal.

The first and second seal members 130 and 140, and the load bearing spacer 120 are sized and configured, and are positioned within the seal cavity 110 such that the load bearing spacer 120 is in between the first and second seal members 130 and 140 such that the load bearing spacer 120 captivates the first and second seal members 130 and 140 within the seal cavity 110. The seal 100 is assembled by first inserting first and second seal members 130 and 140 within the seal cavity 110 such that the first and second seal member 130 and 140 are positioned beneath the respective lip portions 112 and 116. Then, the load bearing spacer 120 is pressed in between the first and second seal members 130 and 140, as depicted in FIG. 4. In this configuration, the side surfaces 126 and 128 of the load bearing spacer 120 push against the first and second seal members 130 and 140, such that the first and second seal members 130 and 140 are forced or biased away from one another. This force acting on the first and second seal members 130 and 140 ensures that the first and second seal members 130 and 140 are captivated within recessed portions 114 and 118 of the seal cavity 110 beneath the lip portions 112 and 116. Note that the first and second seal members 130 and 140 and the load bearing spacer 120 can be removed from the seal cavity 110 by prying or forcing the load bearing member 120 out from between the first and second seal members 130 and 140, and then removing the first and second seal members 130 and 140.

The seal 100 can be provided with a leak check port 150 connected to the seal cavity 110 at opening 152. The leak check port 150 includes a tube leading from the seal cavity 110 and vents to the atmosphere. When a leak is present in either the coolant fluid seal member 130 or the vacuum seal member 140, the leak can be detected via the leak check port 150 using a detection device (not depicted). Note that, if desired, multiple leak check ports can be provided at desired locations about the cylindrical housing section 106.

Figure 3:
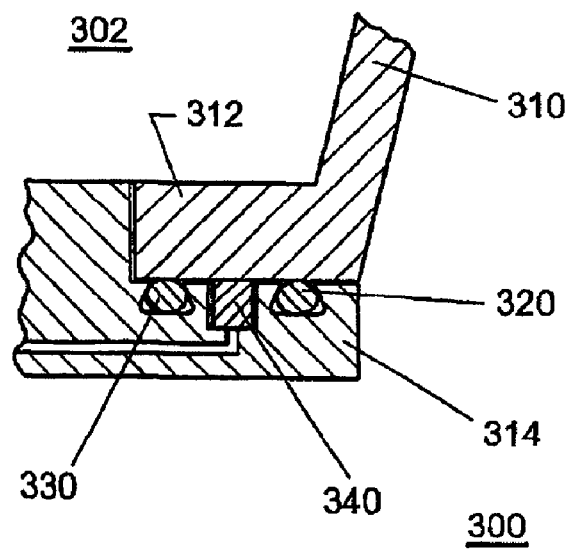
FIG. 3 is a partial cross-sectional view of a second seal configuration for a plasma processing chamber and a process tube.

The second embodiment of the present invention advantageously provides a configuration wherein only one precision groove or seal cavity is required for the seal 100, which includes one load bearing spacer and two seal members. This configuration of elements is adaptable to any size o-ring and load bearing spacers required. This configuration uses much less space on the housing sections, is easier to assemble, and is cheaper to manufacture than other versions described above with regard to FIG. 3.

FIG. 5 depicts a third embodiment of a seal configuration for a fluid cooled process tube 102. The seal 160 is generally identical in structure to the seal 100 described above with regard to FIG. 4, and therefore identical features have been provided with identical reference numerals and a repetitious description of identical features has been omitted as such features are described in detail above. The seal 160 differs from the seal 100 depicted in FIG. 4, in that the load bearing spacer 120 of seal 100 has been replaced with a load bearing spacer 170 in seal 160. The load bearing spacer 170 is adapted to be fastened to the housing section 106. Additionally, the leak check port 150 is not depicted in FIG. 5, however, a leak check port or multiple leak check ports can be provided at desired locations about the cylindrical housing section 106.

The load bearing spacer 170 of the seal 160 includes a contact surface 172 that is configured to abut the surface 105 of the mounting rim 104. The load bearing spacer 170 includes a contact surface 173 that is configured to abut the bottom of the seal cavity 110. The load bearing spacer 170 includes an internal recess 174, of a conical shape (as depicted) or cylindrical shape, and a hole 175 that extends from a bottom of the internal recess 174 to the contact surface 173. The load bearing spacer 170 further includes opposing, preferably inclined, side surfaces 176 and 178. The load bearing spacer 170 is fastened to the housing section 106 by one or more fasteners 180 (for example, a screw or bolt) that are seated within the internal recess 174 and include a threaded shaft 182 that extends through the hole 175 and mates with one or more threaded receiving holes 107 in the housing section. The load bearing spacer 170 is formed in an elongated strip of material of a constant outer cross-sectional shape with internal recess 174 and hole 175 being formed at various desired locations on the seal 160 about the cylindrical housing section 106.

The first and second seal members 130 and 140, and the load bearing spacer 170 are sized and configured, and are positioned within the seal cavity 110 such that the load bearing spacer 170 is in between the first and second seal members 130 and 140 such that the load bearing spacer 170 captivates the first and second seal members 130 and 140 within the seal cavity 110. The seal 160 is assembled by first inserting first and second seal members 130 and 140 within the seal cavity 110 such that the first and second seal member 130 and 140 are positioned beneath the respective lip portions 112 and 116. Then, the load bearing spacer 170 is positioned in between the first and second seal members 130 and 140 and the fastener is inserted to affix the load bearing spacer 170 to the housing section 106, as depicted in FIG. 5. In this configuration, the inclined side surfaces 176 and 178 of the load bearing spacer 170 push against the first and second seal members 130 and 140, such that the first and second seal members 130 and 140 are forced or biased away from one another. This force acting on the first and second seal members 130 and 140 ensures that the first and second seal members 130 and 140 are captivated within recessed portions 114 and 118 of the seal cavity 110 beneath the lip portions 112 and 116.

Figure 6:
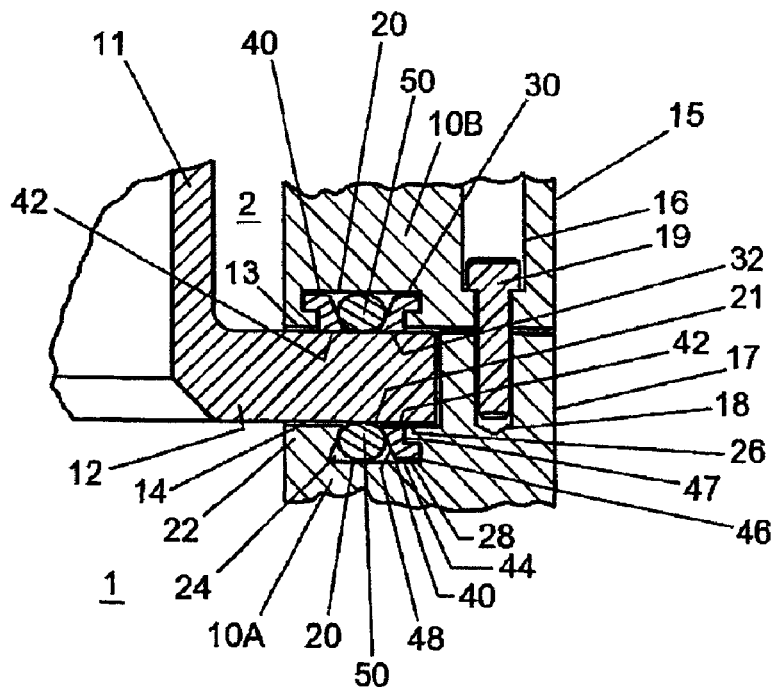
FIG. 6 is a partial cross-sectional view of a fourth embodiment of a seal according to the present invention for a plasma processing chamber and a process tube.

FIG. 6 depicts a fourth embodiment of a seal configuration for a fluid cooled process tube 11 according to the present invention. The embodiment depicted in FIG. 6 is similar to that in FIG. 2 except that the seal 10A is modified to remove the first load bearing spacer 30. In the illustrated embodiment, the protruding section 36 and the inclined surface 38 of the first load bearing spacer 30 is incorporated within the lip portion 22 to avoid contact of plasma with any load bearing spacer.

Note that the spacing depicted in the figures in between the various features are exaggerated in order to more clearly depict the invention.

Note that the term "fluid" is used herein to broadly refer to a substance that exists or is held to exist as a continuum marked by low resistance to flow and the tendency to assume the shape of its container, for example, a substance in a gas state or a substance in a liquid state.

It should be noted that the exemplary embodiments depicted and described herein set forth the preferred embodiments of the present invention, and are not meant to limit the scope of the claims hereto in any way.

Numerous modifications and variations of the present invention are possible in light of the above teachings. It is therefore to be understood that, within the scope of the appended claims, the invention may be practiced otherwise than as specifically described herein.

What is claimed is:

1. A fluid cooled vacuum processing chamber comprising:
a process tube;
a metal housing section joined with said process tube to form a vacuum chamber and a coolant fluid chamber;
a seal interposed between said process tube and metal housing section said seal comprising:
a seal cavity in said housing section, said seal cavity being configured opposite the process tube;
at least one load bearing spacer received within said seal cavity and adapted to contact the process tube; and
at least one seal member received within said seal cavity and adapted to contact the process tube.

2. The seal according to claim 1, wherein said seal cavity has an opening, said seal cavity including a lip portion extending adjacent said opening.

3. The seal according to claim 2, wherein said at least one load bearing spacer includes a protruding portion configured to hook beneath said lip portion of said seal cavity.

4. The seal according to claim 3, wherein said at least one load bearing spacer includes an inclined surface opposite to said protruding portion.

5. The seal according to claim 1, wherein said seal comprises two load bearing spacers and one seal member.

6. The seal according to claim 5, wherein said seal member and said load bearing spacers are positioned within said seal cavity such that said seal member is in between said load bearing spacers.

7. The seal according to claim 6, wherein said seal member captivates said load bearing spacers within said seal cavity.

8. The seal according to claim 1, wherein said seal comprises one load bearing spacer and two seal members.

9. The seal according to claim 8, wherein said seal members and said load bearing spacer are positioned within said seal cavity such that said load bearing spacer is in between said seal members.

10. The seal according to claim 9, wherein said load bearing spacer captivates said seal members within said seal cavity.

11. The seal according to claim 1, further comprising a leak check portion connected to said seal cavity.

12. The seal according to claim 1, wherein said at least one load bearing spacer is adapted to be fastened to the housing.

13. The seal according to claim 12, wherein said at least one load bearing spacer includes an inclined surface configured to captivate said at least one seal member within said seal cavity.

14. A fluid cooled vacuum processing chamber comprising:
a process tube;
a metal housing section joined with said process tube to form a vacuum chamber and a coolant fluid chamber;
a seal for said process tube, said seal comprising:
a first seal cavity in a first section of said housing, said first seal cavity being configured opposite the process tube;
at least one first load bearing spacer received within said first seal cavity and adapted to cushion the process tube from the first section of the housing;
a first seal member received within said first seal cavity and adapted to contact the process tube;
a second seal cavity in a second section of said housing connected to the first section of housing, said second seal cavity being configured opposite the process tube;
at least one second load bearing spacer received within said second seal cavity and adapted to cushion the process tube from the second section of the housing; and
a second seal member received within said second seal cavity and adapted to contact the process tube.

15. A seal for a process tube, said seal comprising:
a first seal cavity in a first section of a housing, said first seal cavity being configured opposite the process tube;
at least one first load bearing spacer received within said first seal cavity and adapted to cushion the process tube from the first section of the housing;
a first seal member received within said first seal cavity and adapted to contact the process tube;
a second seal cavity in a second section of a housing connected to the first section of housing, said second seal cavity being configured opposite the process tube;
at least one second load bearing spacer received within said second seal cavity and adapted to cushion the process tube from the second section of the housing; and
a second seal member received within said second seal cavity and adapted to contact the process tube, wherein:
said first and second seal cavities each have an opening, said first and second seal cavities each including a lip portion extending adjacent said opening; and said at least one first and second load bearing spacers each include a protruding portion configured to hook beneath said lip portion of said seal cavities.

16. The seal according to claim 15, wherein said at least one first and second load bearing spacers each include an inclined surface opposite to said protruding portion.

17. The seal according to claim 14, wherein:

said seal comprises two first load bearing spacers and two second load bearing spacers;

said first seal member and said first load bearing spacers are positioned within said first seal cavity such that said first seal member is in between said first load bearing spacers such that said first seal member captivates said first load bearing spacers within said first seal cavity; and said second seal member and said second load bearing spacers are positioned within said second seal cavity such that said second seal member is in between said second load bearing spacers such that said second seal member captivates said second load bearing spacers within said second seal cavity.

18. A fluid cooled vacuum processing chamber comprising:

a process tube;

a metal housing section joined with said process tube to form a vacuum chamber and a coolant fluid chamber;

a seal comprising:

a seal cavity in said housing, said seal cavity being configured opposite the process tube;

a load bearing spacer received within said seal cavity and adapted to cushion the process tube from the housing;

a first seal member received within said seal cavity and adapted to contact the process tube; and a second seal member received within said seal cavity and adapted to contact the process tube.

19. The seal according to claim 18, further comprising a leak check portion connected to said seal cavity.

20. The seal according to claim 1, wherein said load bearing spacer is adapted to be fastened to the housing, said load bearing spacer including an inclined surface configured to captivate said first seal member and said second seal member within said seal cavity.

* * * * *